(12) United States Patent
Dancuart Kohler et al.

(10) Patent No.: US 7,153,393 B2
(45) Date of Patent: Dec. 26, 2006

(54) METHOD OF PURIFYING FISCHER-TROPSCH DERIVED WATER

(75) Inventors: Luis P. F. Dancuart Kohler, Vaalpark (ZA); Gert H. Du Plessis, Secunda (ZA); Francois J. Du Toit, Sasolburg (ZA); Edward L. Koper, Secunda (ZA); Trevor D. Phillips, Vanderbijlpark (ZA); Janette Van Der Walt, Vaalpark (ZA)

(73) Assignee: Sasol Technology (Pty) Ltd., Johannesburg (ZA)

( * ) Notice: Subject to any disclaimer, the term of this patent is extended or adjusted under 35 U.S.C. 154(b) by 188 days.

(21) Appl. No.: 11/014,518

(22) Filed: Dec. 16, 2004

(65) Prior Publication Data

US 2005/0131085 A1 Jun. 16, 2005

Related U.S. Application Data

(63) Continuation of application No. PCT/ZA03/00080, filed on Jun. 18, 2003.

(60) Provisional application No. 60/390,689, filed on Jun. 18, 2002.

(30) Foreign Application Priority Data

Jun. 18, 2002 (ZA) .................................. 02/4849

(51) Int. Cl.
*C02F 3/00* (2006.01)
(52) U.S. Cl. .................. 201/601; 201/615; 201/616; 201/617; 201/620; 201/622; 201/631; 201/634
(58) Field of Classification Search ............. 201/601, 201/615–617, 620, 622, 631, 634
See application file for complete search history.

(56) References Cited

U.S. PATENT DOCUMENTS

| 2,683,158 | A  | 7/1954  | Brown et al. |
| 4,746,434 | A  | 5/1988  | Grieves et al. |
| 4,948,511 | A  | 8/1990  | Swanson et al. |
| 5,429,942 | A  | 7/1995  | Kock et al. |
| 6,193,872 | B1 | 2/2001  | Reason et al. |
| 6,225,358 | B1 | 5/2001  | Kennedy |
| 6,462,097 | B1 | 10/2002 | Martino et al. |

FOREIGN PATENT DOCUMENTS

| EP | 0 838 435       | 4/1998  |
| GB | 2 023 120       | 12/1979 |
| WO | WO 93/12242     | 6/1993  |
| WO | WO 98/18726     | 5/1998  |
| WO | WO 03/048272 A1 | 6/2003  |
| WO | WO 03/106346    | 12/2003 |
| WO | WO 03/106346 A1 | 12/2003 |
| WO | WO 03/106349 A1 | 12/2003 |
| WO | WO 03/106354 A1 | 12/2003 |

OTHER PUBLICATIONS

UK Search Report, GB 0314081.1, dated Nov. 21, 2003.
UK Examination Report, GB 0314081.1, dated Dec. 31, 2004.
NL Search Report, NL 1023694, dated Jun. 18, 2003.
PCT International Search Report, PCT/ZA03/00078, dated Oct. 29, 2003.
PCT International Preliminary Examination Report, PCT/ZA03/00078, dated Oct. 29, 2004.
PCT Written Opinion, PCT/ZA03/00078.

*Primary Examiner*—Chester T. Barry
(74) *Attorney, Agent, or Firm*—TraskBritt

(57) ABSTRACT

A process for the production of highly purified water from Fischer-Tropsch reaction water includes distillation as a primary treatment stage, evaporation as a secondary treatment stage, aerobic treatment as a tertiary treatment stage, solid-liquid separation as a quartic treatment stage, and membrane separation as a final treatment stage.

20 Claims, 1 Drawing Sheet

METHOD OF PURIFYING FISCHER-TROPSCH DERIVED WATER

CROSS-REFERENCE TO RELATED APPLICATIONS

This application is a continuation of International Application No. PCT/ZA03/00080, filed Jun. 18, 2003 designating the United States, and published, in English, as PCT International Publication No. WO 03/106346 on Dec. 24, 2003, the contents of which are incorporated by this reference, which application claims priority to U.S. Provisional Patent Application Ser. No. 60/390,689 filed Jun. 18, 2002, and ZA 2002/4849 also filed Jun. 18, 2002.

TECHNICAL FIELD

This invention relates to the purification of water produced during Fischer-Tropsch synthesis for which synthesis a variety of carbonaceous materials are used as feedstock.

BACKGROUND OF THE INVENTION

Applicants are aware of processes for the synthesis of water from a carbonaceous feedstock, such as natural gas or coal, which processes also produce hydrocarbons.

One such process is the Fischer-Tropsch process of which the largest product is water and, to a lesser extent, hydrocarbons including olefins, paraffins, waxes, and oxygenates. There are numerous references to this process such as, for example on pages 265 to 278 of "Technology of the Fischer-Tropsch process" by Mark Dry, Catal. Rev. Sci. Eng., Volume 23 (1&2), 1981.

The products from the Fischer-Tropsch process may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

In certain areas where carbonaceous feedstocks are to be found, water is in short supply and a relatively costly commodity. Also, environmental concerns prevent the disposal of polluted water derived from the Fischer-Tropsch process into natural water ways and the sea thereby presenting a case for the production and recovery of useable water at the source of the carbonaceous feedstocks.

The carbonaceous feedstocks typically include coal and natural gas that are converted to hydrocarbons, water and carbon dioxide during Fischer-Tropsch synthesis. Naturally, other carbonaceous feedstocks such as, for example, methane hydrates found in marine deposits, can also be used.

Before the water produced during the Fischer-Tropsch process is purified in accordance with the present invention, it is typically subjected to preliminary separation aimed at isolating a water-enriched stream from the Fischer-Tropsch products.

The preliminary separation process includes condensing the gaseous product from the Fischer-Tropsch reactor and separating it in a typical three-phase separator. The three streams exiting the separator are: a tail gas, a hydrocarbon condensate including mainly hydrocarbons in the $C_5$ to $C_{20}$ range and a reaction water stream containing non-acid chemicals, water, acids, and suspended hydrocarbons.

The reaction water stream is then separated using a coalescer that separates the reaction water stream into a hydrocarbon suspension and a water-rich stream.

The coalescer is capable of removing hydrocarbons from the reaction water stream to a concentration of between 10 ppm and 1000 ppm, typically 50 ppm.

The water-enriched stream thus obtained forms the feedstock for the method according to the present invention and will be denoted in this specification by the term "Fischer-Tropsch reaction water."

The composition of the water-enriched stream or reaction water is largely dependent on the catalyst metal used in the Fischer-Tropsch reactor and the reaction conditions (e.g., temperature, pressure) employed. The Fischer-Tropsch reaction water can contain oxygenated hydrocarbons including aliphatic, aromatic and cyclic alcohols, aldehydes, ketones and acids, and to a lesser extent aliphatic, aromatic and cyclic hydrocarbons such as olefins and paraffins.

The Fischer-Tropsch reaction water may also contain small quantities of inorganic compounds including metals from the Fischer-Tropsch reactor, as well as nitrogen and sulphur containing species that originate from the feedstock.

The influence of the type of Fischer-Tropsch synthesis used on the quality of Fischer-Tropsch reaction water is illustrated in typical organic analysis (Table 1) of Fischer-Tropsch reaction water generated from three different synthesis operating modes, namely:

TABLE 1

Typical Organic Composition of Fischer-Tropsch reaction water from Different Fischer-Tropsch Synthesis Operating Modes

| Component (mass %) | LTFT (Cobalt Catalyst) | LTFT (Iron Catalyst) | HTFT (Iron Catalyst) |
| --- | --- | --- | --- |
| Water | 98.89 | 95.70 | 94.11 |
| non-acid oxygenated hydrocarbons | 1.00 | 3.57 | 4.47 |
| Acidic oxygenated hydrocarbons | 0.09 | 0.71 | 1.41 |
| Other Hydrocarbons | 0.02 | 0.02 | 0.02 |
| Inorganic components | <0.005 | <0.005 | <0.005 |

Low Temperature Fischer-Tropsch LTFT Cobalt or Iron catalysts
High Temperature Fischer-Tropsch HTFT Iron catalyst It is evident from the typical analyses of Fischer-Tropsch reaction waters of different origin (Table 1) that these waters, in particular HT Fischer-Tropsch reaction water, contain relatively high concentrations of organic compounds, and direct application or disposal of these waters is generally not feasible without further treatment to remove undesirable constituents. The degree of treatment of the Fischer-Tropsch reaction water depends largely on the intended application, and it is possible to produce a wide range of water qualities ranging from boiler feed water to partially treated water which may be suitable for discharge to the environment.

It is also possible to co-treat Fischer-Tropsch reaction water with other typical process waste water as well as rain water.

The water purification processes described in this invention may, after making minor adaptations, also be used for the processing of aqueous streams derived from generic synthesis gas conversion processes using metallic catalysts similar to the catalysts used during Fischer-Tropsch synthesis.

SUMMARY OF THE INVENTION

According to a first aspect of the invention, there is provided a process for the production of purified water from Fischer-Tropsch reaction water, which process includes at least the steps of:

(a) a primary treatment stage comprising an equilibrium staged separation process having at least one stage for removing at least a fraction of non-acid oxygenated hydrocarbons from the Fischer-Tropsch reaction water to produce a primary water-enriched stream;

(b) a secondary treatment stage comprising evaporation of at least a portion of the primary water-enriched stream thereby to reduce the total mass fraction of organic constituents in the unevaporated portion to produce a secondary water-enriched stream; and (c) a final treatment stage comprising solid-liquid separation for removing at least some solids from at least a portion of the secondary water-enriched stream.

According to a second aspect of the invention there is provided a process for the production of purified water from Fischer-Tropsch reaction water, which process includes at least the steps of:

(a) a primary treatment stage comprising an equilibrium stage separation process having at least one stage for removing at least a fraction of non-acid oxygenated hydrocarbons from the Fischer-Tropsch reaction water to produce a primary water-enriched stream;

(b) a secondary treatment stage comprising evaporation of at least a portion of the primary water-enriched stream thereby to reduce the total mass fraction of organic constituents in the unevaporated portion to produce a secondary water-enriched stream;

(c) a tertiary treatment stage comprising biological treatment for removing at least a fraction of dissolved organic carbon from the secondary water-enriched stream to produce a tertiary water-enriched stream; and (d) a quartic treatment stage comprising solid-liquid separation for removing at least some solids from at least a portion of the tertiary water-enriched stream.

The term "purified water" is to be interpreted as meaning an aqueous stream having a COD of between 20 and 500 mg/l, a pH of between 6.0 and 9.0, a suspended solids content of less than 250 mg/l and a total dissolved solids content of less than 600 mg/l.

The non-acid oxygenated hydrocarbons are typically selected from the group including: alcohols, ketones and aldehydes, and are more specifically selected from the group including: acetaldehyde, propionaldehyde, butyraldehyde, acetone, methyl-propyl-ketone, methanol, ethanol, propanol, butanol, pentanol, hexanol, and heptanol.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g., acetic acid, propionic acid) and optionally trace quantities of non-acid compounds. As a result of the presence of organic acids, the primary water-enriched stream is known as Fischer-Tropsch acid water.

The overheads from distillation may be recovered and worked-up to products, or may be used for fuel or as an energy source.

The primary treatment stage may include degassing of the reaction water before further processing to remove compounds having a very low boiling point and dissolved gases from the Fischer-Tropsch reaction water.

Typically, Fischer-Tropsch reaction water originating from HTFT iron catalyst processes which water has undergone primary treatment has limited application due to the relatively high concentrations (>1% by mass) of organic acids remaining in the FT acid water and further treatment of the water is required. In contrast, Fischer-Tropsch reaction water originating from cobalt-based LTFT processes which water has undergone primary treatment contains significantly lower organic acid concentrations (<0.1% mass %) and can therefore, following neutralization, be released to the environment if sufficient dilution is available and discharge standards permit. The primary water-enriched stream may also have limited application as process water.

The evaporation in step (b) may take place at ambient temperature and pressure in a cooling tower.

During evaporation in the cooling tower, the amount of at least some of the dissolved organic constituents contained in the primary water-enriched stream is reduced through the action of micro-organisms. The constituents being removed totally or partially include acidic oxygenated hydrocarbons and methanol.

By using the primary water-enriched stream as cooling water, the abundance of oxygen caused by aeration in the cooling tower activates the growth of micro-organisms that use dissolved organic constituents in the primary water-enriched stream as food source.

The evaporation may comprise use of the primary water-enriched stream as make up water to an evaporative cooling tower. The evaporative cooling tower may be selected from the group including: mechanical-draft cooling towers, natural-draft cooling towers and forced-draft cooling towers.

When using the primary water-enriched stream as cooling water, the linear flow velocity of said water through the equipment being used in the cooling must be sufficiently high enough to inhibit deposition of suspended solids in said equipment.

The pH of the primary water-enriched stream should be controlled by addition of an alkali, such as caustic soda, to prevent acid corrosion of metal and/or concrete surfaces that might be exposed to this water.

One or more suitable additives may be added to the primary water-enriched stream before using it as cooling water to inhibit undesirable effects such as, for example, fouling, corrosion and scaling.

Biological treatment of the secondary water-enriched stream may include aerobic treatment.

The aerobic treatment method may be the same as is conventionally used for domestic and industrial wastewater treatment.

The aerobic treatment may include adding nutrients in the form of nitrogen (e.g., urea, ammonia or ammonium salts) and phosphorus (e.g., phosphate salts) containing compounds to accelerate microbiological degradation of the organic carbon-containing constituents. In addition, pH control using alkali compounds such as lime, caustic and soda ash may be required to optimize the performance of the micro-organisms.

A wide range of technologies may be used in the aerobic treatment of the secondary water-enriched stream. Such technologies may be selected from a group including: Activated Sludge processes, High-rate Compact Reactors, Biological Aerated Filters, Trickling filters, Rotating Biological Contactors, Membrane Bioreactors and Fluidized Bed reactors. The aerobic production of Single Cell Protein (SCP) has also been successfully developed.

Apart from a water-rich or tertiary water-enriched stream, aerobic treatment typically yields carbon dioxide and sludge as byproducts. The carbon dioxide may be released to the environment. The sludge may be incinerated, used as land fill, fertilizer, soil conditioner or as a source of SCP.

The quartic treatment stage may be aimed at removing suspended solids from the tertiary water-enriched stream produced during biological treatment.

Suspended solid removal may be achieved by methods selected from the group including: sand filtration, membrane separation (e.g., microfiltration or ultrafiltration), flocculation sedimentation, dissolved air flotation (with or without the use of flocculants) and centrifugation.

Local discharge standards or the intended application will dictate the required level and type of quartic treatment.

Applications for the purified water produced by the method described above may include its use as cooling water, irrigation water or general process water.

The purified water typically has the following characteristics:

| Property | | |
|---|---|---|
| Chemical Oxygen Demand (COD) | mg/l | 20–500 |
| pH | | 6.0–9.0 |
| Total Dissolved Solids (TDS) | mg/l | <600 |
| Suspended solids (SS) | mg/l | <250 |

According to a third aspect of the invention, there is provided a process for the production of highly purified water from Fischer-Tropsch reaction water, which process includes at least the steps of:
(a) a primary treatment stage comprising an equilibrium staged separation process having at least one stage for removing at least a fraction of non-acid oxygenated hydrocarbons from the Fischer-Tropsch reaction water to produce a primary water-enriched stream;
(b) a secondary treatment stage comprising evaporation of at least a portion of the primary water-enriched stream thereby to reduce the total mass fraction of organic constituents in the unevaporated portion to produce a secondary water-enriched stream;
(c) a tertiary treatment stage comprising solid-liquid separation for removing at least some solids from at least a portion of the secondary water-enriched stream, to produce a tertiary water-enriched stream; and
(d) a quartic treatment stage comprising a dissolved salt and organic removal stage for removing at least some dissolved salts and organic constituents from at least a portion of the tertiary water enriched stream.

According to a fourth aspect of the invention there is provided a process for the production of highly purified water from Fischer-Tropsch reaction water, which process includes at least the steps of:
(a) a primary treatment stage comprising an equilibrium stage separation process having at least one stage for removing at least a fraction of non-acid oxygenated hydrocarbons from the Fischer-Tropsch reaction water to produce a primary water-enriched stream;
(b) a secondary treatment stage comprising evaporation of at least a portion of the primary water-enriched stream thereby to reduce the total mass fraction of organic constituents in the unevaporated portion to produce a secondary water-enriched stream;
(c) a tertiary treatment stage comprising biological treatment for removing at least a fraction of dissolved organic carbon from the secondary water-enriched stream to produce a tertiary water-enriched stream;
(d) a quartic treatment stage comprising solid-liquid separation for removing at least some solids from at least a portion of the tertiary water-enriched stream to produce a quartic water-enriched stream; and
(e) a final treatment stage comprising a dissolved salt and organic removal stage for removing at least some dissolved salts and organic constituents from at least a portion of the quartic water enriched stream.

The term "highly purified water" is to be interpreted as meaning an aqueous stream having a COD of less than 50 mg/l, a pH of between 6.0 and 9.0, a suspended solids content of less than 50 mg/l and a total dissolved solids content of less than 100 mg/l.

The non-acid oxygenated hydrocarbons are typically selected from the group including: aldehydes, ketones and alcohols, and are more specifically selected from the group including: acetaldehyde, propionaldehyde, butyraldehyde, acetone, methyl-propyl-ketone, methanol, ethanol, propanol, butanol, pentanol, hexanol, and heptanol.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g., acetic acid, propionic acid) and optionally trace quantities of non-acid compounds. As a result of the presence of organic acids, the primary water-enriched stream is known as Fischer-Tropsch acid water.

The overheads from distillation may be recovered and worked-up to products, or may be used for fuel or as an energy source.

The primary treatment stage may include degassing of the reaction water before further processing to remove compounds having a very low boiling point and dissolved gases from the Fischer-Tropsch reaction water.

Typically, Fischer-Tropsch reaction water originating from HTFT iron catalyst processes which water has undergone primary treatment has limited application due to the relatively high concentrations (>1% by mass) of organic acids remaining in the FT acid water and further treatment of the water is required. In contrast, Fischer-Tropsch reaction water originating from cobalt-based LTFT processes which water has undergone primary treatment contains significantly lower organic acid concentrations (<0.1% mass %) and can therefore, following neutralization, be released to the environment if sufficient dilution is available and discharge standards permit. The primary water-enriched stream may also have limited application as process water.

The evaporation in step (b) may take place at ambient temperature and pressure in a cooling tower.

During evaporation in the cooling tower, the amount of at least some of the dissolved organic constituents contained in the primary water-enriched stream is reduced through the action of micro-organisms. The constituents being removed totally or partially include acidic oxygenated hydrocarbons and methanol.

By using the primary water-enriched stream as cooling water, the abundance of oxygen caused by aeration in the cooling tower activates the growth of micro-organisms that use dissolved organic constituents in the primary water-enriched stream as food source.

The evaporation may comprise use of the primary water-enriched stream as make up water to an evaporative cooling tower. The evaporative cooling tower may be selected from the group including: mechanical-draft cooling towers, natural-draft cooling towers and forced-draft cooling towers.

When using the primary water-enriched stream as cooling water, the linear flow velocity of said water through the equipment being used in the cooling process must be sufficiently high enough to inhibit deposition of suspended solids in said equipment.

The pH of the primary water-enriched stream should be controlled by addition of an alkali, such as caustic soda, to prevent acid corrosion of metal and/or concrete surfaces that might be exposed to this water.

One or more suitable additives may be added to the primary water-enriched stream before using it as cooling water to inhibit undesirable effects such as, for example, fouling, corrosion and scaling.

Biological treatment of the secondary water-enriched stream may include aerobic treatment.

The aerobic treatment method may be the same as is conventionally used for domestic and industrial wastewater treatment.

The aerobic treatment may include adding nutrients in the form of nitrogen (e.g., urea, ammonia or ammonium salts) and phosphorus (e.g., phosphate salts) containing compounds to accelerate microbiological degradation of the organic carbon-containing constituents. In addition, pH control using alkali compounds such as lime, caustic and soda ash may be required to optimize performance of the micro-organisms.

A wide range of technologies may be used in the aerobic treatment of the secondary water-enriched stream. Such technologies may be selected from a group including: Activated Sludge processes, High-rate Compact Reactors, Biological Aerated Filters, Trickling filters, Rotating Biological Contacters, Membrane Bioreactors, and Fluidized Bed reactors. The aerobic production of Single Cell Protein (SCP) has also been successfully developed.

Apart from a water-rich or tertiary water-enriched stream, aerobic treatment typically yields carbon dioxide and sludge as byproducts. The carbon dioxide may be released to the environment. The sludge may be incinerated, used as land fill, fertilizer, soil conditioner or as a source of SCP.

The quartic treatment stage may be aimed at removing suspended solids from the water-rich stream produced during biological treatment.

Suspended solid removal may be achieved by methods selected from the group including: sand filtration, membrane separation (e.g., micro- or ultrafiltration), flocculation sedimentation, dissolved air flotation (with or without the use of flocculants) and centrifugation.

Residual organic species not removed during biological treatment and solids removal may be removed by methods selected from the group including: chemical oxidation using agents such as ozone and hydrogen peroxide, ultraviolet light generated free radicals and adsorption/absorption processes including activated carbon treatment and organic scavenging resins.

Dissolved salts, originating from secondary treatment (i.e., pH control chemicals, nutrient addition) and/or from the co-treatment of other process effluents, can be further reduced by methods from the group including: ion exchange, reverse osmosis, nano-filtration and chemical precipitation processes including hot and cold lime softening.

Applications for the highly purified water produced by the method described above may include its use as boiler feed water and drinking water.

The highly purified water typically has the following characteristics:

| Property | | |
| --- | --- | --- |
| Chemical Oxygen Demand (COD) | mg/l | <50 |
| pH | | 6.0–9.0 |
| Total Dissolved Solids (TDS) | mg/l | <100 |
| Suspended Solids (SS) | mg/l | <50 |

Advantages inherent in the purified and highly purified water produced according to the present invention are that the water will contain only a small amount of dissolved solids because the Fischer-Tropsch reaction water is essentially a solids-free stream. The low levels of residual salts in the purified water are a result of controlled addition of chemicals used during the purification process sequence and/or the co-treatment of other dissolved solids containing effluents. The residual salts include Ca, Mg, Na, K, Cl, $SO_4$, $HCO_3$ and $CO_3$ combinations. The low dissolved solids concentrations in Fischer-Tropsch reaction water can simplify and reduce the cost of the purification process.

DETAILED DESCRIPTION OF THE INVENTION

Figure 1:
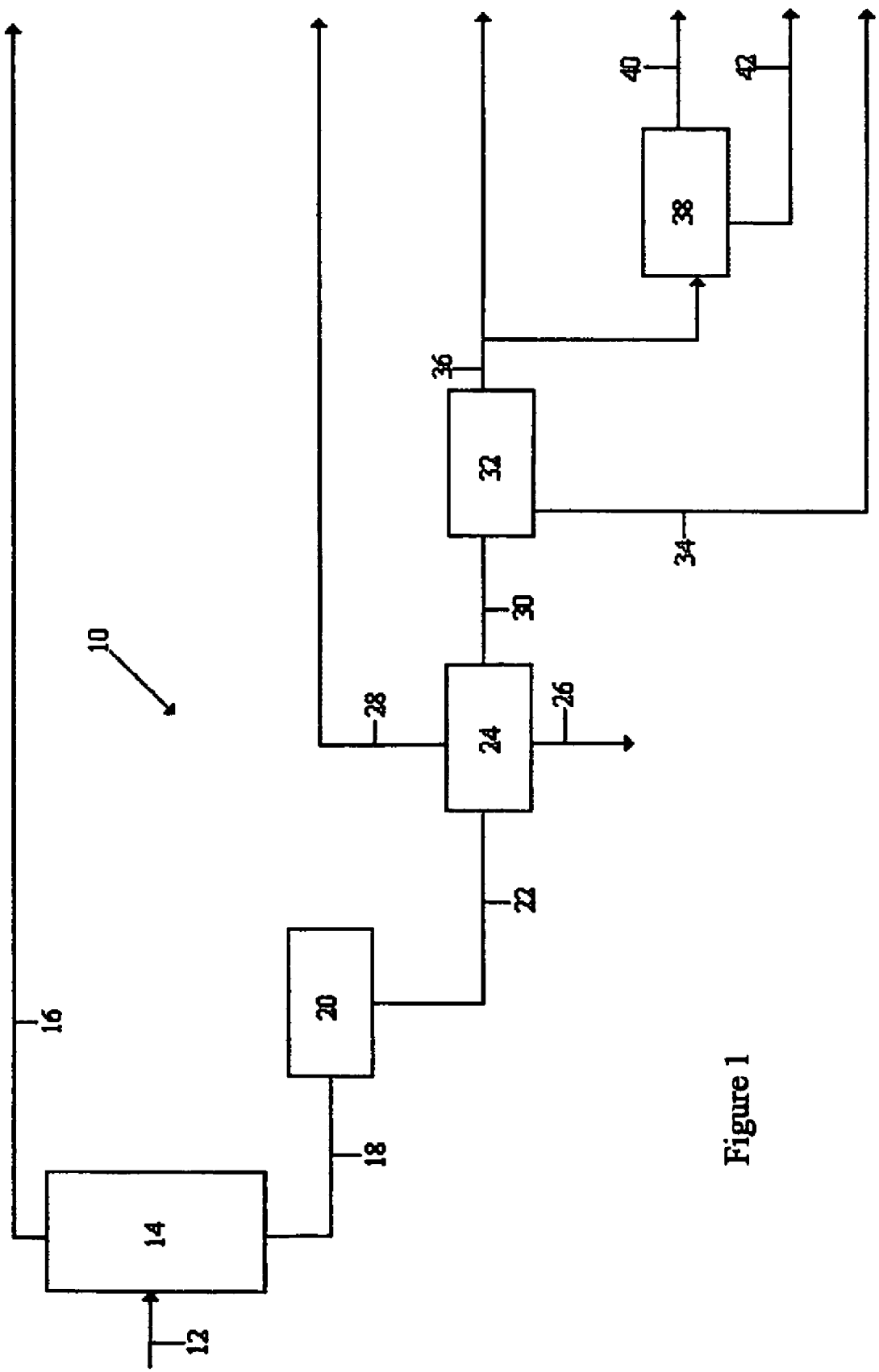
FIG. 1 shows a simplified block diagram of a method 10 according to the present invention including various treatment options.

The invention will now be described by way of the following non-limiting examples with reference to the accompanying drawing.

As previously stated, FIG. 1 shows a simplified block diagram of a method 10 according to the present invention including various treatment options.

Fischer-Tropsch reaction water 12 is fed to a distillation column 14 for primary treatment.

Two streams 16 and 18 exit distillation column 14. Stream 16 contains predominantly organic constituents whilst stream 18 is a primary water-enriched stream.

Stream 18 is then fed to a forced draft cooling tower 20 in which the stream 18 is used as make up water for a forced-draft cooling tower. By utilizing stream 18 as cooling water, its volume is reduced by evaporation and the amount of at least some of the dissolved organic constituents in stream 18 are reduced due to the abundance of oxygen caused by aeration in the cooling tower 20 activating the growth of micro-organisms that use dissolved organic constituents in the primary water-enriched stream 18 as food source.

Stream 22 is the blow down or unevaporated water portion (or secondary water-enriched stream) from the cooling tower 20 and is subjected to biological treatment in the form of aerobic digestion 24 which produces sludge 26, carbon dioxide 28 and a tertiary water-enriched stream 30.

The next treatment stage involves subjecting the tertiary water-enriched stream 30 to solid-liquid separation 32 during which solids 34 in the form of sludge as well as a stream of purified water 36 are produced.

Some of the purified water 36 from the solid-liquid separation 32 stage is subjected to a final treatment stage in the form of membrane separation 38 to yield highly purified water 40 and concentrate 42. Stream 42 contains non-biodegradable organic species, concentrated inorganic salts, for example, sulphates and chlorides of sodium and calcium as well as elevated concentrations of suspended solids.

Depending on the final intended use of the purified 36 or highly purified water 40, the minimum water quality requirements are as set out in Table 2 below and the operating conditions of the equipment used in the method as well as suitable treatment options can be selected accordingly.

TABLE 2

Water Quality - Typical Requirements

|  | Process Water | Irrigation water | Cooling water | Boiler feed water | Drinking water |
|---|---|---|---|---|---|
| COD mg/l | 0–75 |  | 0–30 | 0–10 |  |
| pH | 5–10 | 6.5–8.4 | 6.5–8 | 7–8 | 6–9 |
| TDS mg/l | 0–1600 | <40 | 0–450 | 0–100 | 0–450 |
| SS mg/l | 0–25 | 0–50 | 0–5 | 0–3 | <20 |

Having described the basic aspects of the invention, the following example is given to further illustrate a specific embodiment of the invention.

EXAMPLE

Treatment of Fischer-Tropsch Reaction Water Derived from a Cobalt Catalyst LTFT Process After separation of by-products, a water-enriched stream from a LTFT process was degassed at atmospheric pressure. Free hydrocarbons in the water-enriched stream were reduced to 0.01% (mass %) using a coalescer.

Primary treatment of the thus obtained Fischer Tropsch reaction water was undertaken using distillation. Analysis of the FT acid water bottoms of the distillation column is detailed in Table 3 below. It is apparent that with the exception of trace quantities of methanol, most other non-acid oxygenated hydrocarbons were removed during primary distillation leaving an organic acid enriched or primary water-enriched stream (i.e., 0.072 mass % organic acids) with a pH value of 3.5. The measured Chemical Oxygen Demand (COD) of this effluent was in the order of 800 mg $O_2$/l.

TABLE 3

Typical Composition of LTFT Reaction Water Feed and Acid Water Bottoms During Primary Treatment (Distillation)

| Component | Reaction water feed to primary distillation column (mass %) | Acid water - bottoms of primary distillation column (mass %) |
|---|---|---|
| Water | 97.629 | 99.840 |
| Acetaldehyde | 0.019 | 0.000 |
| Propionaldehyde | 0.002 | 0.000 |
| Butyraldehyde | 0.001 | 0.000 |
| Acetone | 0.007 | 0.000 |
| MPK | 0.001 | 0.000 |
| Methanol | 0.434 | 0.001 |
| Ethanol | 0.369 | 0.000 |
| Propanol | 0.140 | 0.000 |
| iso-Propanol | 0.002 | 0.000 |
| Butanol | 0.056 | 0.000 |
| Pentanol | 0.047 | 0.000 |
| iso-Pentanol | 0.001 | 0.000 |
| Hexanol | 0.019 | 0.000 |
| Iso-Hexanol | 0.001 | 0.000 |
| Heptanol | 0.007 | 0.000 |
| Other NAC | 0.004 | 0.000 |
| Total NAC | 1.106 | 0.001 |
| Formic acid | 0.025 | 0.025 |
| Acetic acid | 0.039 | 0.040 |
| Propionic acid | 0.002 | 0.002 |
| Butyric acid | 0.002 | 0.002 |
| Other acids | 0.006 | 0.006 |
| Total Acids | 0.070 | 0.072 |
| Other Hydrocarbons | 0.011 | 0.011 |

The primary water-enriched stream was fed into an open holding tank at approximately 70° C.

In order to sustain a microbiological population in the primary water-enriched stream, nitrogen in the form of urea and phosphate in the form of phosphoric acid were added to said stream. The pH of the primary water-enriched stream was thereafter adjusted to 5 using sodium hydroxide.

The primary water-enriched stream was then fed to a forced draft cooling tower as make up water. The cooling tower was operated at four cycles of concentration and a 10° C. delta T.

Removal of organics (measured as COD) from the primary water-enriched stream in the tower was in the order of 45% with volatile acid removal at about 55%. The COD of the recirculating water in the tower was approximately 1800 mg/l and the concentration of suspended solids was approximately 200 mg/l whilst the pH of the water varied between 6.5 and 7.5.

Corrosion, fouling and scaling in the cooling tower and surrounding heat exchangers was kept within acceptable limits by applying an appropriate chemical treatment program that included a biodispersant and a scale inhibitor.

The blow down or unevaporated water portion from the cooling tower (secondary water-enriched stream) was then treated in a completely mixed activated sludge system (aerobic treatment) under the following conditions:

pH: 7.2 to 7.5
Dissolved oxygen concentration: >2 mg/l
Temperature: 35° C.
HRT: 30 hours
F/M ratio: 0.2–0.4 kg COD/kg MLSS.d
Cell retention time (sludge age)—13 days
Feed to recycle ratio: 1:2

A COD removal efficiency of 91% was achieved and the thus obtained tertiary water-enriched stream had a COD of 160 mg/l. The suspended solid concentration of the tertiary water-enriched stream was on average about 120 mg/l.

The tertiary water-enriched stream was then subjected to sand filtration to reduce its SS concentration to 25 mg/l. The thus obtained purified water has application as a both irrigation water and process cooling water. Sludge produced in the process was incinerated.

As an alternative to treatment in an activated sludge system, the blow down or part of the blow down from the cooling tower was diverted to a cross-flow membrane unit fitted with a 0.2 μm polypropylene microfiltration membrane. A permeate flux rate of 70–80 $l/m^2.h$ was obtained during stable operation of the unit. The water recovery across the unit varied between 75–85%. The resultant COD and SS concentrations in the permeate from the microfiltration unit were 1750 mg $O_2/l$ and <5 mg/l respectively.

The pH of the purified water from the microfiltration unit was adjusted to 8.5 using sodium hydroxide and the purified water was pumped to a reverse osmosis unit fitted with a high rejection polyamide sea water membrane. A permeate flux rate of 20–25 $l/m^2.h$ was obtained during stable operation of the unit. The water recovery across the reverse osmosis unit varied between 80–90%. The unit yielded a highly purified water stream with COD and TDS concentrations of 45–50 mg $O_2/l$ and 20–30 mg/l respectively.

It is to be appreciated that the invention is not limited to any specific embodiment or configuration as herein before generally described or illustrated, for example, rain water or water enriched streams from processes other than Fischer-Tropsch synthesis may be purified according to the method described above.

What is claimed is:

1. A process for the production of purified water from Fischer-Tropsch reaction water, wherein the purified water is an aqueous stream having a COD of between 20 and 500 mg/l, a pH of between 6.0 and 9.0, a suspended solids content of less than 250 mg/l and a total dissolved solids content of less than 600 mg/l, and wherein the process includes at least the steps of:
   (a) a primary treatment stage comprising an equilibrium staged separation process having at least one stage for removing at least a fraction of non-acid oxygenated hydrocarbons from the Fischer-Tropsch reaction water to produce a primary water-enriched stream;
   (b) a secondary treatment stage comprising evaporation of at least a portion of the primary water-enriched stream thereby reducing the total mass fraction of organic constituents in the unevaporated portion to produce a secondary water-enriched stream;
   (c) a tertiary treatment stage comprising biological treatment for removing at least a fraction of dissolved organic carbon from the secondary water-enriched stream to produce a tertiary water-enriched stream; and
   (d) a quartic treatment stage comprising solid-liquid separation for removing at least some solids from at least a portion of the tertiary water-enriched stream.

2. The process of claim 1, wherein the non-acid oxygenated hydrocarbons are selected from the group including: acetaldehyde, propionaldehyde, butyraldehyde, acetone, methyl-propyl-ketone, methanol, ethanol, propanol, butanol, pentanol, hexanol, and heptanol and wherein the dissolved organic carbon is selected from the group including: aldehydes, ketones, alcohols, and organic acids.

3. The process of claim 1, wherein the equilibrium staged separation process for use in the primary treatment stage is selected from the group including: distillation, solvent extraction using liquid solvents, and solvent extraction using liquefied gases.

4. The process of claim 1, wherein the primary treatment stage includes degassing of the Fischer-Tropsch reaction water before further processing in the primary treatment stage to remove compounds having a very low boiling point and dissolved gases from the Fischer-Tropsch reaction water.

5. The process of claim 1, wherein the evaporation in step (b) takes place by using the primary water-enriched stream as make up water to an evaporative cooling tower at ambient temperature and pressure.

6. The process of claim 5, wherein the evaporative cooling tower is selected from the group including: mechanical-draft cooling towers, natural-draft cooling towers, and forced-draft cooling towers.

7. The process of claim 1, wherein the biological treatment of step (c) is an aerobic treatment method selected from group including: Activated Sludge processes, Biological Aerated Filters, Trickling filters, Rotating Biological Contactors, High-rate Compact Reactors, Membrane Bioreactors and Fluidized Bed reactors.

8. The process of claim 1, wherein the quartic treatment stage removes suspended solids from the tertiary water-enriched stream produced during biological treatment.

9. The process of claim 8, wherein the suspended solid removal is achieved by one or more method selected from the group including: sand filtration, membrane separation, flocculation sedimentation, dissolved air flotation with the use of flocculants, dissolved air flotation without the use of flocculants, and centrifugation.

10. A process for the production of highly purified water from Fischer-Tropsch reaction water, wherein the highly purified water is an aqueous stream having a COD of less than 50 mg/l, a pH of between 6.0 and 9.0, a suspended solids content of less than 50 mg/l and a total dissolved solids content of less than 100 mg/l, and wherein the process includes at least the steps of:
   (a) a primary treatment stage comprising an equilibrium staged separation process having at least one stage for removing at least a fraction of non-acid oxygenated hydrocarbons from the Fischer-Tropsch reaction water to produce a primary water-enriched stream;
   (b) a secondary treatment stage comprising evaporation of at least a portion of the primary water-enriched stream thereby to reduce the total mass fraction of organic constituents in the unevaporated portion to produce a secondary water-enriched stream;
   (c) a tertiary treatment stage comprising biological treatment for removing at least a fraction of dissolved organic carbon from the secondary water-enriched stream to produce a tertiary water-enriched stream;
   (d) a quartic treatment stage comprising solid-liquid separation for removing at least some solids from at least a portion of the tertiary water-enriched stream to produce a quartic water-enriched stream; and
   (e) a final treatment stage comprising a dissolved salt and organic removal stage for removing at least some dissolved salts and organic constituents from at least a portion of the quartic water-enriched stream.

11. The process of claim 10, wherein the non-acid oxygenated hydrocarbons are selected from the group including: aldehydes, ketones, alcohols, and organic acids.

12. The process of claim 10, wherein the equilibrium staged separation process for use in the primary treatment stage is selected from the group including: distillation, solvent extraction using liquid solvents, and solvent extraction using liquefied gases.

13. The process of claim 10, wherein the primary treatment stage includes degassing of the reaction water before further processing in the primary treatment stage to remove compounds having a very low boiling point and dissolved gases from the Fischer-Tropsch reaction water.

14. The process of claim 10, wherein the evaporation in step (b) takes place at ambient temperature and pressure in a cooling tower selected from the group including: mechanical-draft cooling towers, natural-draft cooling towers, and forced-draft cooling towers.

15. The process of claim 10, wherein the biological treatment of step (c) is an aerobic treatment method selected from group including: Activated Sludge processes, Biological Aerated Filters, Trickling filters, Rotating Biological Contactors, High-rate Compact Reactors, Membrane Bioreactors, and Fluidized Bed reactors.

16. The process of claim 10, wherein the quartic treatment stage removes suspended solids from the tertiary water-enriched stream produced during biological treatment.

17. The process of claim 16, wherein the suspended solid removal is achieved by one or more method selected from the group including: sand filtration, membrane separation, flocculation sedimentation, dissolved air flotation with the use of flocculants, dissolved air flotation without the use of flocculants, and centrifugation.

18. The process of claim 10, wherein residual organic species are removed in the final treatment stage by one or more methods selected from the group including: chemical oxidation, ultraviolet light generated free radicals, adsorption and/or absorption processes.

19. The process of claim 18, wherein the adsorption and/or absorption processes include one or both of activated carbon treatment and the use of organic scavenging resins.

20. The process of claim 10, wherein dissolved salts originating from tertiary treatment and/or from the co-treatment of other process effluents, are reduced in the final treatment stage by one or more method selected from the group including: ion exchange, reverse osmosis, nano-filtration, and chemical precipitation processes.

* * * * *